US010050695B1

(12) United States Patent
Tsai et al.

(10) Patent No.: US 10,050,695 B1
(45) Date of Patent: Aug. 14, 2018

(54) METHOD FOR BEAMFORMING AND CONTROL APPARATUS USING THE SAME

(71) Applicant: Industrial Technology Research Institute, Hsinchu (TW)

(72) Inventors: Zuo-Min Tsai, Miaoli County (TW); Hao-Hsuan Chen, Hsinchu County (TW)

(73) Assignee: Industrial Technology Research Institute, Hsinchu (TW)

( * ) Notice: Subject to any disclaimer, the term of this patent is extended or adjusted under 35 U.S.C. 154(b) by 1 day.

(21) Appl. No.: 15/652,243

(22) Filed: Jul. 18, 2017

(30) Foreign Application Priority Data

Apr. 21, 2017 (TW) .............................. 106113533 A

(51) Int. Cl.
*H04B 7/08* (2006.01)
*H04B 1/16* (2006.01)

(52) U.S. Cl.
CPC ............ *H04B 7/0897* (2013.01); *H04B 1/16* (2013.01)

(58) Field of Classification Search
CPC .. H04B 7/0408; H04B 7/0617; H04B 7/0848; H04B 1/0483; H04B 7/0894; H04B 7/0897
USPC .......................... 375/267, 299, 344, 347, 349
See application file for complete search history.

(56) References Cited

U.S. PATENT DOCUMENTS

| | | | | |
|---|---|---|---|---|
| 6,188,913 | B1 * | 2/2001 | Fukagawa | H01Q 3/2605 342/359 |
| 8,170,617 | B2 * | 5/2012 | Nassiri-Toussi | H04B 7/0408 375/299 |
| 8,942,299 | B2 | 1/2015 | Lin et al. | |
| 9,287,960 | B2 * | 3/2016 | Kishimoto | H04B 7/0682 |
| 2005/0140546 | A1 * | 6/2005 | Park | G01S 7/4008 342/368 |
| 2007/0263748 | A1 | 11/2007 | Mesecher | |
| 2008/0280571 | A1 | 11/2008 | Rofougaran et al. | |

(Continued)

FOREIGN PATENT DOCUMENTS

| | | |
|---|---|---|
| CN | 103401072 | 7/2015 |
| TW | 201633741 | 9/2016 |

OTHER PUBLICATIONS

Y. Lee et al., "A hybrid RF/baseband precoding processor based on parallel-index-selection matrix-inversion-bypass simultaneous orthogonal matching pursuit for millimeter wave MIMO systems," IEEE Trans. Signal Process, vol. 63 Issue:2, Jan. 2015, pp. 305-317.

(Continued)

*Primary Examiner* — Emmanuel Bayard
(74) *Attorney, Agent, or Firm* — JCIPRNET

(57) ABSTRACT

The disclosure provides a method for beamforming and a control apparatus using the same. An embodiment of the method includes: adjusting a first amplitude magnification of a first baseband signal, and adjusting a second amplitude magnification of the first baseband signal; generating a first signal according to the first baseband signal and the first amplitude magnification, and generating a second signal according to the first baseband signal and the second amplitude magnification; inserting a phase difference between the first signal and the second signal; and converting the first signal and the second signal having the phase difference therebetween into a beamformed signal to control an antenna.

22 Claims, 9 Drawing Sheets

(56) References Cited

U.S. PATENT DOCUMENTS

| | | | |
|---|---|---|---|
| 2013/0088391 A1* | 4/2013 | Corman | H04B 7/10 |
| | | | 342/365 |
| 2016/0135175 A1* | 5/2016 | Tarlazzi | H04W 28/08 |
| | | | 370/329 |
| 2017/0019067 A1* | 1/2017 | Chakraborty | H03D 7/1441 |
| 2017/0187110 A1* | 6/2017 | Fujio | H01Q 3/38 |

OTHER PUBLICATIONS

C. Lin et al., "Adaptive beamforming with resource allocation for distance-aware multi-user indoor Terahertz communications," IEEE Trans. Commun, Aug. 2015, pp. 2985-2995.

F. Sohrab et al., "Hybrid digital and analog beamforming design for large-scale MIMO systems," IEEE International Conference on Acoustics, Speech and Signal Processing (ICASSP), Apr. 2015, pp. 2929-2933.

J. D. Fredrick et al., "A smart antenna receiver array using a single RF channel and digital beamforming," IEEE Transactions on Microwave Theory and Techniques, vol. 50 Issue: 12, Dec. 2002, pp. 3052-3058.

Rakshith Rajasheka et al. "Hybrid Beamforming in mm-Wave MIMO Systems Having a Finite Input Alphabet," IEEE Transactions on Communications, vol. 64 Issue: 8, Aug. 2016, pp. 3337-3349.

David K. Mesecher et al., "A Physical Layer Open Architecture for Communications Systems Integration:Common Baseband Processor With Multiple-Access Adaptively Steered Antenna Array," Applications and Technology Conference, 2008 IEEE Long Island, 2008, pp. 1-10.

\* cited by examiner

METHOD FOR BEAMFORMING AND CONTROL APPARATUS USING THE SAME

CROSS-REFERENCE TO RELATED APPLICATION

This application claims the priority benefit of Taiwan application serial no. 106113533, filed on Apr. 21, 2017. The entirety of the above-mentioned patent application is hereby incorporated by reference herein and made a part of this specification.

TECHNICAL FIELD

The disclosure relates to a communication method and apparatus, and particularly relates to a method for beamforming and a control apparatus.

BACKGROUND

Despite the development of science and technology, further efforts are still required in the wireless communication technologies relating to millimeter wave (mmWave). In general, one of the concerns is that significant attenuation of wave energy may occur during propagation of the mmWave. The attenuation is closely related to the high frequency band at which an mmWave communication system operates and a rather large bandwidth required for communication in the mmWave communication system. More specifically, compared with the third generation (3G) or the fourth generation (4G) communication system commonly used nowadays, the mmWave communication system adopts a relatively higher frequency band for communication. It is known that an intensity of an electromagnetic wave energy received by a receiver is negatively proportional to a square of a signal transmission distance and is positively proportional to a wavelength of an electromagnetic signal. Therefore, the degree to which the signal energy of the mmWave communication system attenuates is significantly increased because of the high frequency signal with a shorter wavelength adopted in the mmWave communication system. In addition, the use of the high frequency signal also results in a drastic decrease in antenna aperture, and may also result in a decrease in the signal energy for signal transmission in the mmWave communication system. Therefore, to ensure the communication quality, a transceiver in the mmWave communication system normally requires a multi-antenna beamforming technology to reduce signal energy attenuation and thus facilitate the performance of signal transmission and reception.

Generally speaking, the multi-antenna beamforming technology includes arranging an antenna array including a plurality of antennas in a base station/user apparatus and controlling the antennas so that the base station/user apparatus may generate a directional beam. The beamforming technology achieved with the antenna array is crucial to the performance of the mmWave communication system. A conventional beamforming communication framework is implemented by adopting a phase shifter or a digital beamforming synthesizing technology. Since the phase shifter may result in a great loss of signals in a main line at a high frequency, and the precision of phase adjustment is not high, a great number of digital-analog (DA) converters are required when the digital beamforming synthesizing technology is applied, making an apparatus size increased. Thus, how to design an mmWave beamforming apparatus with a higher precision has become an issue to work on.

SUMMARY

An embodiment of the disclosure provides a control apparatus for beamforming, including a first baseband amplitude control circuit, a second baseband amplitude control circuit, a frequency mixer, and a controller. The first baseband amplitude control circuit and the second baseband amplitude control circuit receive a first baseband signal. The frequency mixer is coupled to the first baseband amplitude control circuit and the second baseband amplitude control circuit. The controller is coupled to the first baseband amplitude control circuit and the second baseband amplitude control circuit, adjusts a first amplitude magnification of the first baseband signal in the first baseband amplitude control circuit and adjusts a second amplitude magnification of the first baseband signal in the second baseband amplitude control circuit. The first baseband amplitude control circuit generates a first signal according to the first baseband signal and the first amplitude magnification, and the second baseband amplitude control circuit generates a second signal according to the first baseband signal and the second amplitude magnification. The frequency mixer receives the first signal and the second signal and inserts a phase difference between the first signal and the second signal. The frequency mixer converts the first signal and the second signal having the phase difference therebetween into a beamformed signal to control an antenna.

From another perspective, an embodiment of the disclosure provides a control method for beamforming. The method includes: adjusting a first amplitude magnification of a first baseband signal, and adjusting a second amplitude magnification of the first baseband signal; generating a first signal according to the first baseband signal and the first amplitude magnification, and generating a second signal according to the first baseband signal and the second amplitude magnification; inserting a phase difference between the first signal and the second signal; and converting the first signal and the second signal having the phase difference therebetween into a beamformed signal to control an antenna.

Several exemplary embodiments accompanied with figures are described in detail below to further describe the disclosure in details.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the disclosure.

DETAILED DESCRIPTION OF DISCLOSED EMBODIMENTS

A conventional beamforming communication framework is implemented by adopting a phase shifter or a digital beamforming synthesizing technology. When a phase shifter is used, the phase shifter is mostly disposed at a radio frequency (RF) end or a local oscillator (LO) end of the beamforming communication system. Besides, in digital beamforming synthesizing, the beamforming communication system may adjust a phase of a baseband signal when the baseband signal is still a digital signal.

Figure 1A:
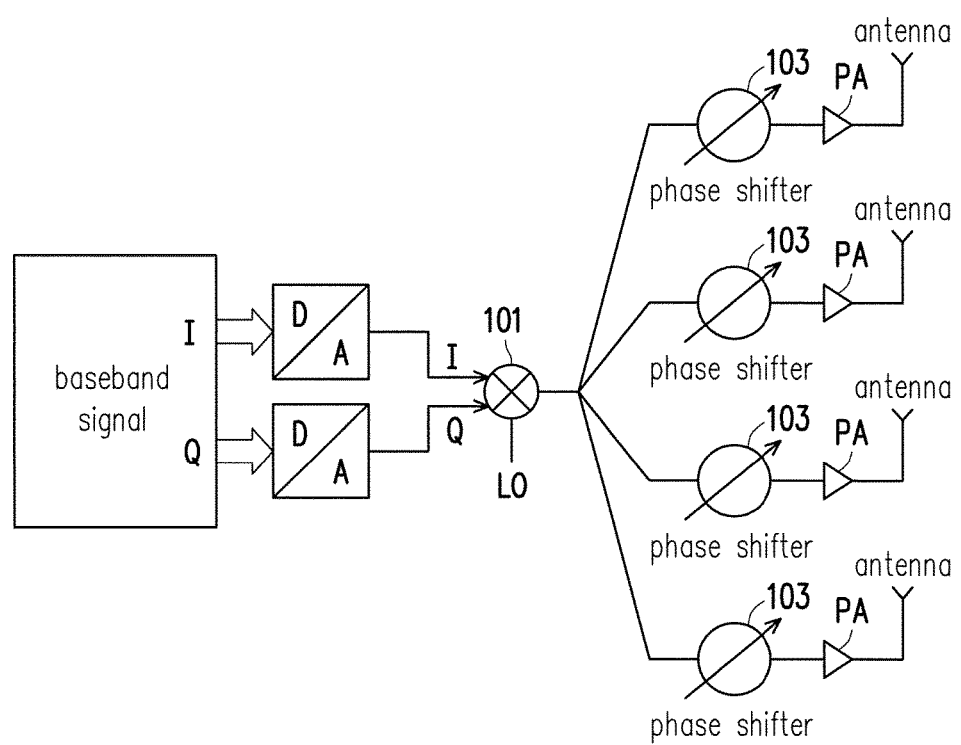
FIGS. 1A, 1B, and 1C are diagrams illustrating a framework of beamforming.
Figure 1B:
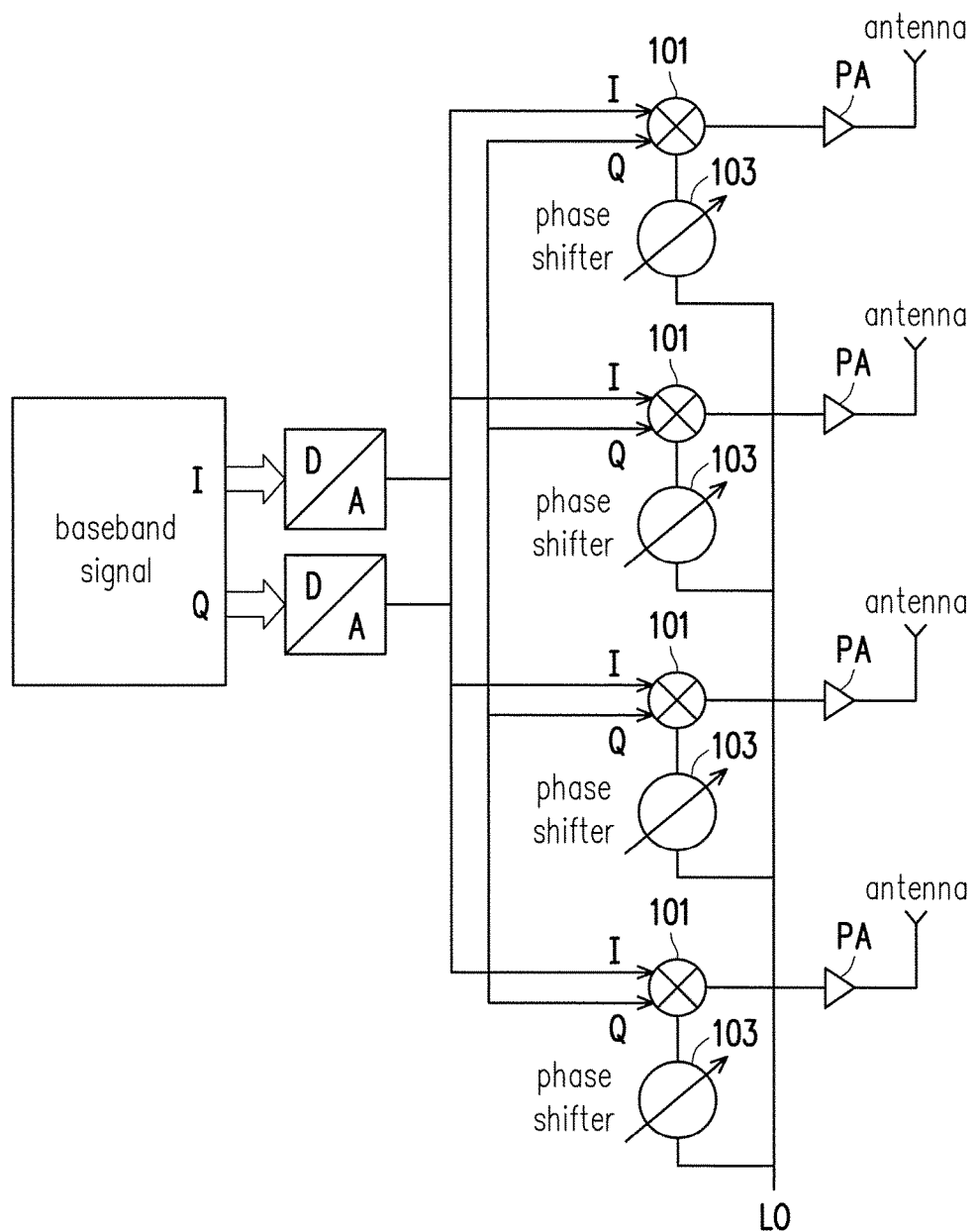

FIGS. 1A, 1B, and IC are respectively diagrams illustrating a framework of beamforming. First, referring to FIG. 1A, in an apparatus for beamforming shown in FIG. 1A, the phase shifter is arranged at the RF end. Before an antenna transmits an analog signal, a phase of the analog signal is adjusted by a phase shifter 103. In the framework, the corresponding phase shifter 103 needs to be disposed at the RF end of each antenna in the apparatus for beamforming. However, since the phases resulting from the adjustment may differ when the phase shifter is operated at different bands, the signals transmitted at the RF end may often require different carrier frequencies. Thus, it is more difficult to precisely adjust the signals by the phase shifter at the RF end.

In an apparatus for beamforming shown in FIG. 1B, the phase shifter 103 is arranged at the LO end. Accordingly, the phase shifter 103 may adjust the phase of the signal before the signal at the LO end is transmitted to a frequency mixer 101. Since the signals transmitted from the LO end is at a fixed frequency, under the framework, the phase shifter 103 is able to more precisely adjust the phase of the analog signal to be transmitted by the antenna without being affected by frequency. However, compared with the apparatus for beamforming shown in FIG. 1, the framework requires a greater number of the frequency mixers 101.

Figure 1C:
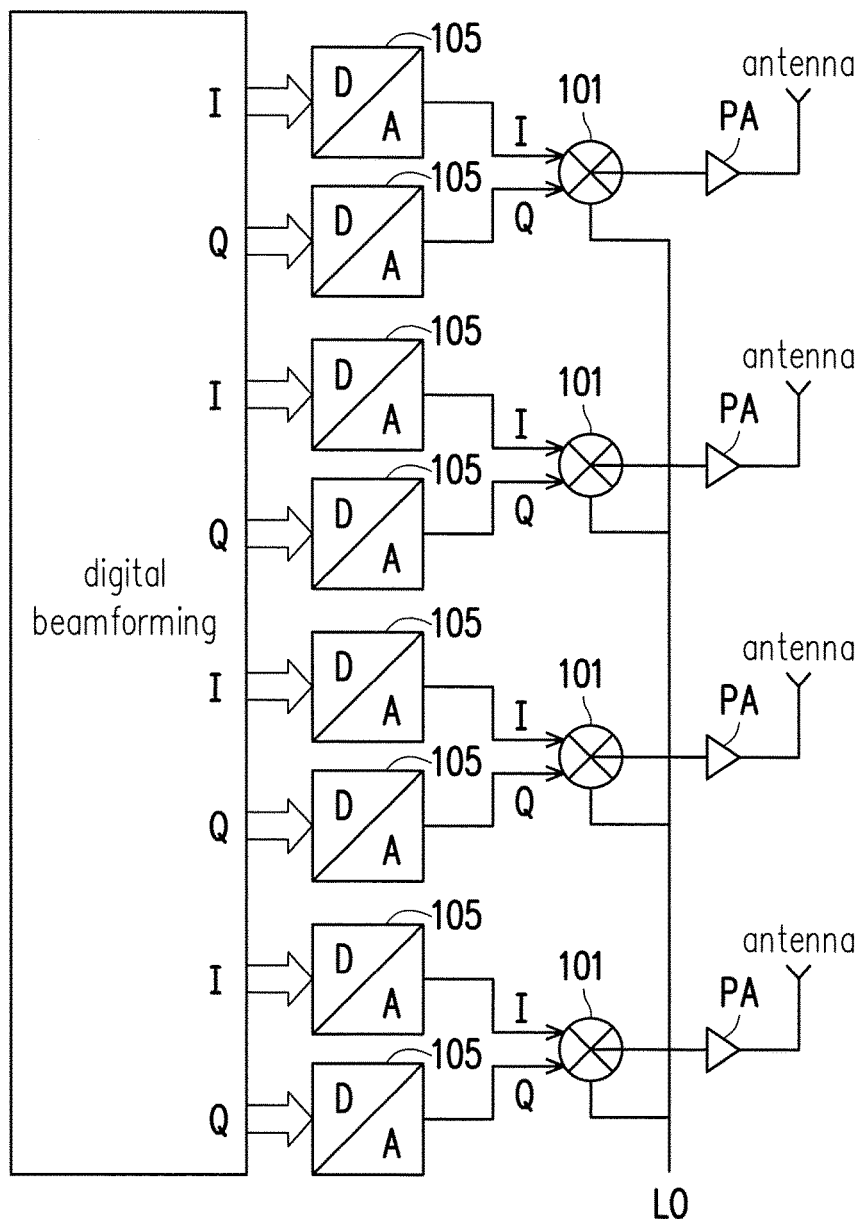

In an apparatus for beamforming shown in FIG. 1C, a beamformed signal is generated through digital beamforming synthesizing. The apparatus for beamforming is able to adjust an in-phase (I) component signal and a quadrature (Q) component signal of the beamformed signal before the I component signal and the Q component signal are converted from digital signals into analog signals, so that the beamformed signal has a suitable phase. Under the framework, the apparatus for beamforming does not require a phase shifter and thus permits a more flexible design. However, the framework requires a greater amount of digital-to-analog (DA) converters, thus resulting in a greater size and a higher cost of the apparatus for beamforming.

Figure 2A:
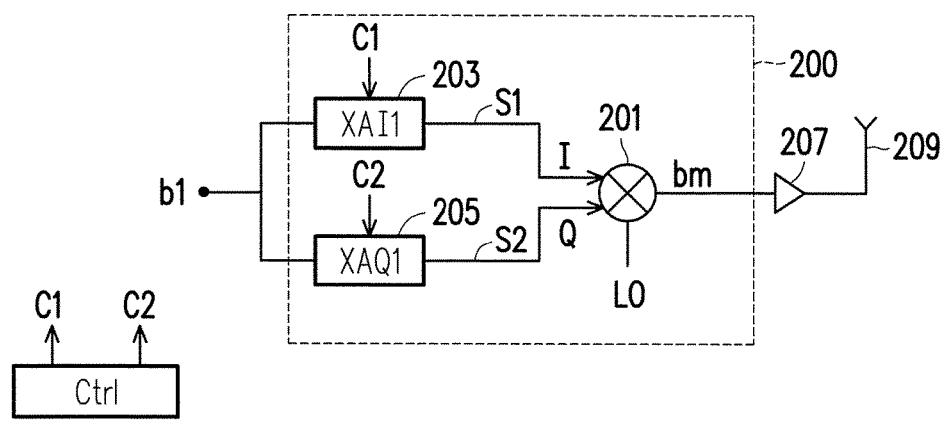
FIG. 2A is a schematic view illustrating a control apparatus for beamforming for a communication system with a single antenna and a single input baseband signal according to an embodiment of the disclosure.

FIG. 2A is a schematic view illustrating a control apparatus 200 for beamforming for a communication system with a single antenna and a single input baseband signal according to an embodiment of the disclosure. The control apparatus 200 for beamforming may include a first baseband amplitude control circuit 203, a second baseband amplitude control circuit 205, a frequency mixer 201, and a controller Ctrl. In addition, the controller Ctrl is coupled to and controls the first baseband amplitude control circuit 203 and the second baseband amplitude control circuit 205.

The first baseband amplitude control circuit 203 and the second baseband amplitude control circuit 205 are power amplifiers (PAs), for example, and are able to amplify or reduce an amplitude of an input signal to a predetermined extent and output the input signal with the amplified or reduced amplitude. The first baseband amplitude control circuit 203 and the second baseband amplitude control circuit 205 may also be other types of circuits capable of controlling the amplitude of a signal. The disclosure does not intend to impose a limitation on this regard.

The controller Ctrl may be implemented to be a microprocessor, a microcontroller, a digital signal processing chip, a field programmable gate array, and other similar programmable units. The disclosure does not intend to impose a limitation on this regard.

In the embodiment, the first baseband amplitude control circuit 203 and the second baseband amplitude control circuit 205 may receive a first baseband signal b1. The first baseband signal b1 may be an analog signal, and the first baseband signal b1 may be generated by converting a digital baseband signal by a DA converter.

The frequency mixer 201 may have two signal input ends, an LO signal end, and a signal output end. In addition, the signal input ends are respectively coupled to the first baseband amplitude control circuit 203 and the second baseband amplitude control circuit 205. The frequency mixer 201 is able to step up a frequency, and is able to insert a phase difference between two input signals. The phase difference is an included angle between vectors of the two input signals. For example, if the frequency mixer 201 is an in-phase and quadrature (IQ) frequency mixer, the frequency mixer 201 may consider two input signals as an in-phase (I) component and a quadrature (Q) component of an output signal of the frequency mixer 201. Specifically, the frequency mixer 201 may generate a 90-degree phase difference between two received input signals, and mix a LO signal received from the LO signal end respectively with the two input signals, so as to modulate carrier frequencies suitable for the two input signals. The carrier frequency may be set at an arbitrary frequency in a range from 30 GHz to 300 GHz (i.e., a millimeter wave frequency band). Accordingly, the frequency mixer 201 may adjust the carrier frequency of the output signal through the LO signal, and may output an output signal formed by linearly superposing the two input signals (I component and Q component). It should be noted that the respective embodiments of the disclosure assume that the frequency mixer 201 is an IQ frequency mixer. However, the disclosure is not limited thereto. In other words, the disclosure does not intend to limit that the phase difference between two input signals generated by the frequency mixer 201 is 90 degrees.

The controller Ctrl may control a first amplitude magnification of the first baseband signal b1 in the first baseband amplitude control circuit 203 according to a control signal c1 and control a second amplitude magnification of the first baseband signal b1 in the second baseband amplitude control circuit 205 according to the control signal c2. In an embodiment, based on a transmission requirement of another apparatus (e.g., requests such as the choice on an antenna beam, whether an antenna scans a specified or unspecified area, or the like), the first amplitude magnification and the second amplitude magnification of the first baseband signal b1 are adjusted to adjust a phase of a beamformed signal bm. The first baseband amplitude control circuit 203 may generate a first signal s1 according to the first baseband signal b1 and the first amplitude magnification, and the second baseband amplitude control circuit 205 may generate a second signal s2 according to the first baseband signal b1 and the second amplitude magnification. For example, as shown in FIG. 2A, the controller Ctrl may adjust a magnification of the first baseband signal b1 in the first baseband amplitude control circuit 203 to be AI1. Accordingly, the first baseband amplitude control circuit 203 may output the first baseband signal b1 (i.e., the first signal s1 shown in FIG. 2A) whose amplitude is amplified AI1 times. Similarly, the controller Ctrl may adjust a magnification of the first baseband signal b1 in the second baseband amplitude control circuit 205 to be AQ1. Accordingly, the second baseband amplitude control circuit 205 may output the first baseband signal b1 (i.e., the second signal s2 shown in FIG. 2A) whose amplitude is amplified AQ1 times.

The frequency mixer 201 may receive the first signal s1 and the second signal s2, and insert a phase difference between the first signal s1 and the second signal s2. Then, the frequency mixer may convert the first signal s1 and the second signal s2 having the phase difference therebetween into the beamformed signal bm to control the antenna 209. For example, after receiving the first signal s1 and the second signal s2, the frequency mixer 201 may modulate carrier frequencies suitable for the first signal s1 and the second signal s2 through the LO signal received by the frequency mixer 201. In addition, the frequency mixer 201 may adopt the first signal s1 and the second signal s2 as the I component and the Q component of the beamformed signal bm to be output to adjust the phase of the beamformed signal bm and transmit the beamformed signal bm in a suitable direction.

Figure 3:
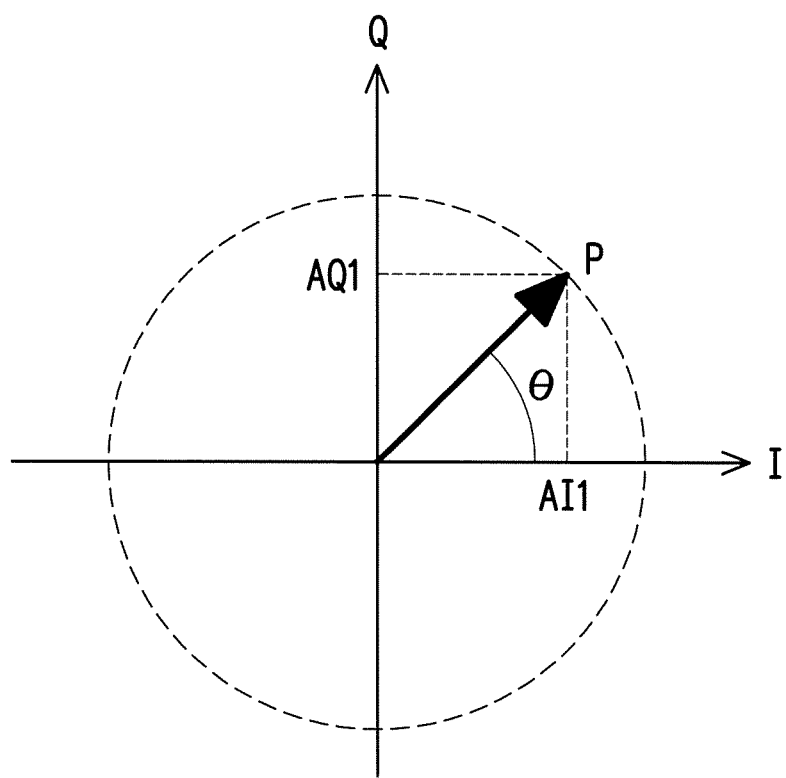
FIG. 3 is a schematic view illustrating modulating a beamformed signal with a frequency mixer according to an embodiment of the disclosure.

Details concerning adjusting the phase of the beamformed signal bm using the first signal s1 and the second signal s2 are shown in FIG. 3. FIG. 3 is a schematic view illustrating modulating the beamformed signal bm with a frequency mixer according to an embodiment of the disclosure. The process shown in FIG. 3 is suitable for the frequency mixer 201 in the control apparatus 200 for beamforming in the embodiment of FIG. 2A. First of all, the amplitude magnifications of the first baseband amplitude control circuit 203 and the second baseband amplitude control circuit 205 on the input signals of the first baseband amplitude control circuit 203 and the second baseband amplitude control circuit 205 are adjusted by the controller Ctrl. Taking FIG. 2A as an example, assuming that the first amplitude magnification corresponding to the first baseband amplitude control circuit 203 and the second amplitude magnification corresponding to the second baseband amplitude control circuit 205 are respectively adjusted AI1 times and AQ1 times by the controller Ctrl, and assuming that the first baseband signal b1 is a time-variant signal, the first signal s1 and the second signal s2 may be represented as:

$$s1(t) = b1(t) \times AI1$$

$$s2(t) = b1(t) \times AQ1$$

The frequency mixer 201 may adopt the first signal s1 and the second signal s2 as the I component and the Q component of the beamformed signal bm to be output, so as to adjust the phase of the beamformed signal bm. The beamformed signal bm obtained after the adjustment by the frequency mixer 201 may be represented as:

$$bm = AI1 \cdot b1(t) \cdot \sin(\omega t) + AQ1 \cdot b1(t) \cdot \cos(\omega t)$$
$$= b1(t) \cdot \sqrt{AI1^2 + AQ1^2} \times e^{j\tan^{-1}\frac{AQ1}{AI1}},$$

$$R = \sqrt{AI1^2 + AQ1^2},$$

$$\theta = \tan^{-1}\frac{AQ1}{AI1},$$

wherein a phase of the beamformed signal is an arctangent function of a ratio between the first amplitude magnification and the second amplitude magnification, $\omega=2\pi f$, and f is a LO signal frequency provided by the local oscillator.

According to the formula of the beamformed signal bm, when the controller Ctrl intends to adjust the phase of the beamformed signal bm to be $\theta$, the controller Ctrl may find a point p whose phase angle is $\theta$ on a circle with a radius R, and then find an AI1 value corresponding to $\theta$ through a component of the point P on an I axis, and then find an AQ1 value corresponding to $\theta$ through a component of the point P on a Q axis. Accordingly, the controller Ctrl may arbitrarily set the phase of the beamformed signal bm by adjusting the values of AI1 and AQ1. In general, the controller Ctrl may set the value of R to be constantly 1 by adjusting a sum of squares of the first amplitude magnification and the second amplitude magnification. In other words, the controller Ctrl may find the first amplitude magnification and the second amplitude magnification corresponding to $\theta$ in a unit circle with a radius of 1. Accordingly, the frequency mixer 201 may not affect an amplitude of the beamformed signal bm when generating the beamformed signal bm. Then, the amplitude of the beamformed signal bm is suitably adjusted by a power amplifier. In an embodiment, the controller Ctrl may also set the value of R not to be 1 by adjusting the sum of squares of the first amplitude magnification and the second amplitude magnification. In other words, the controller Ctrl may find the first amplitude magnification and the second amplitude magnification corresponding to $\theta$ in a unit circle with a radius not equal to 1.

According to the embodiment shown in FIG. 2A, the adjustment to the beamformed signal bm by the control apparatus 200 for beamforming in the disclosure is carried out through an analog circuit. During the adjustment to the beamformed signal bm, the first baseband signal b1, the first signal s1, the second signal s2, and the beamformed signal bm are analog signals. Accordingly, compared with digital beamforming synthesizing as shown in FIG. 1C, a significant number of DA converters may be omitted in the disclosure. Besides, the control apparatus 200 for beamforming does not use any phase shifter when adjusting the beamformed signal bm. The precision of the adjustment to the beamformed signal bm by the control apparatus 200 for beamforming is thus not affected by variation of the frequency of the first baseband signal b1 or the LO signal.

Figure 2B:
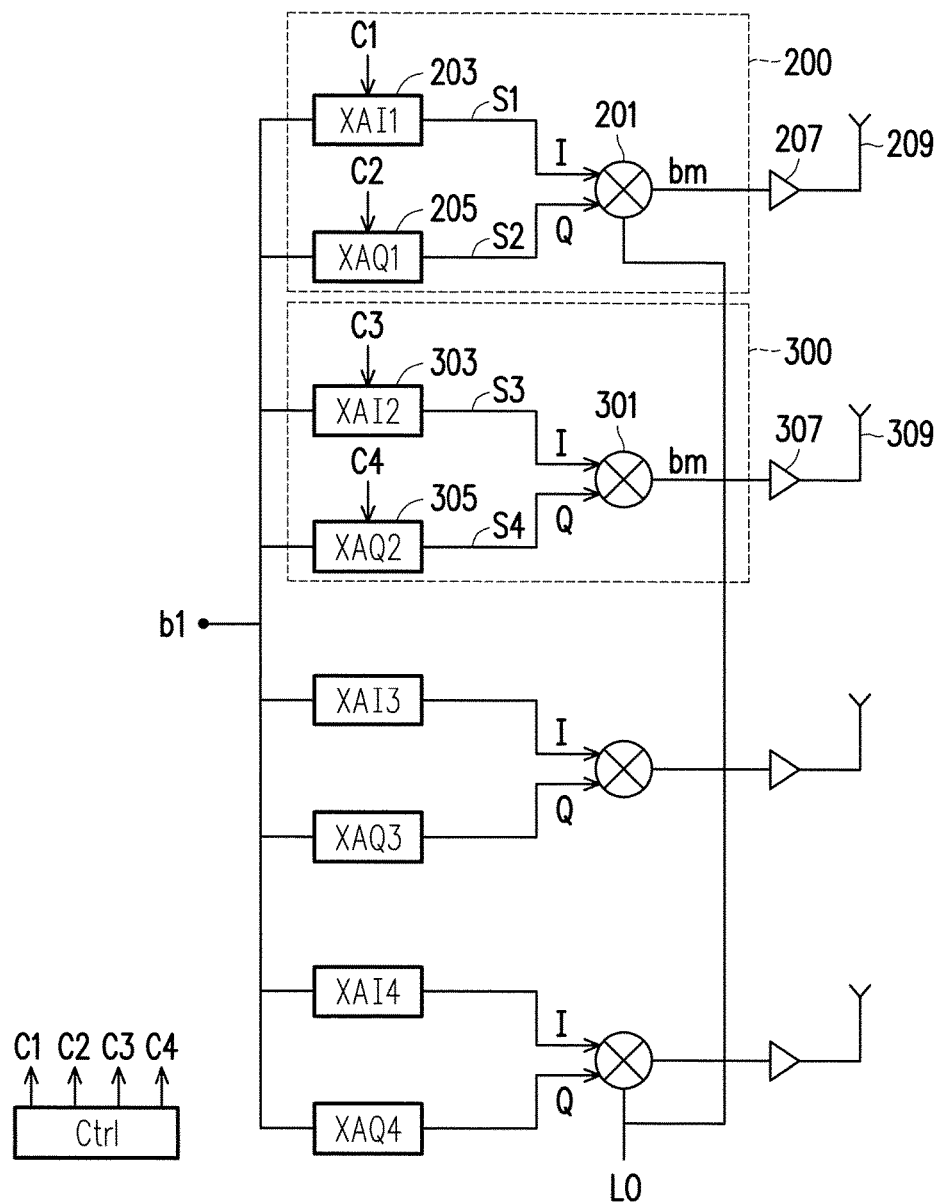
FIG. 2B is a schematic view illustrating a control apparatus for beamforming for a communication system with multiple antennas and a single input baseband signal according to an embodiment of the disclosure.

FIG. 2B is a schematic view illustrating a control apparatus for beamforming for a communication system with multiple antennas and a single input baseband signal according to an embodiment of the disclosure. In addition, the configuration and the operating principle of the control apparatus 200 for beamforming are the same as those of the control apparatus 200 for beamforming in FIG. 2A. Thus, details in these aspects will not be repeated in the following.

In addition to being implemented in a communication system with a single antenna to control the beamformed signal of the single antenna, the control apparatus 200 for beamforming of the disclosure may also be implemented in a communication system with multiple antennas to control the beamformed signals of the antenna. FIG. 2B illustrates an example of controlling the beamformed signals of four antennas. To control the beamformed signals of multiple antennas, the control apparatus 200 for beamforming of the disclosure may be disposed to each of the antennas. In the example of FIG. 2B, the control apparatus 200 for beamforming is disposed to a first antenna 209, and a control apparatus 300 for beamforming having the same configuration and function as those of the control apparatus 200 for beamforming is disposed to a second antenna 309. The control apparatus 300 for beamforming may include a first baseband amplitude control circuit 303, a second baseband amplitude control circuit 305, a frequency mixer 301, and the controller Ctrl. In addition, the control apparatus 300 for beamforming may share the controller Ctrl with the control apparatus 200 for beamforming to adjust the amplitude magnifications of the respective baseband amplitude control circuits or the control apparatus 300 for beamforming and the control apparatus 200 for beamforming may use respectively different controllers. The disclosure does not intend to impose a limitation in this regard.

The first baseband amplitude control circuit 303 and the second baseband amplitude control circuit 305 of the control apparatus 300 for beamforming have the same configurations and operating principles as those of the first baseband amplitude control circuit 203 and the second baseband amplitude control circuit 205 of the control apparatus 200 for beamforming. In other words, when the controller Ctrl intends to control a phase of a beamformed signal bm1 of the antenna 309 to θ1, the controller Ctrl may also respectively adjust the first amplitude magnification of the first baseband amplitude control circuit 303 and the second amplitude magnification of the second baseband amplitude control circuit 305 AI2 times and AQ2 times, so that the beamformed signal bm1 satisfies a formula as follows:

$$bm1 = AI2 \cdot b1(t) \cdot \sin(\omega t) + AQ2 \cdot b1(t) \cdot \cos(\omega t)$$
$$= b1(t) \cdot \sqrt{AI2^2 + AQ2^2} \times e^{j\tan^{-1}\frac{AQ2}{AI2}},$$
$$R = \sqrt{AI2^2 + AQ2^2},$$
$$\theta 1 = \tan^{-1}\frac{AQ2}{AI2},$$

wherein a phase of the beamformed signal is an arctangent function of a ratio between the first amplitude magnification and the second amplitude magnification, ω=2πf, and f is a frequency of the LO signal provided by the local oscillator.

Accordingly, the control apparatuses for beamforming the same as the control apparatus 200 for beamforming are disposed to the respective antennas, and the first amplitude magnifications of the first baseband amplitude control circuits and the second amplitude magnifications of the second baseband amplitude control circuits in the respective control apparatuses for beamforming are adjusted by the controller. Hence, the user may adjust the first baseband signal b1 into a plurality of beamformed signals having different phases by a plurality of baseband amplitude control circuits, so that the beamformed signals have different directionality properties and are respectively transmitted to a plurality of signal receiving ends at different geographical locations via different antennas.

Figure 4A:
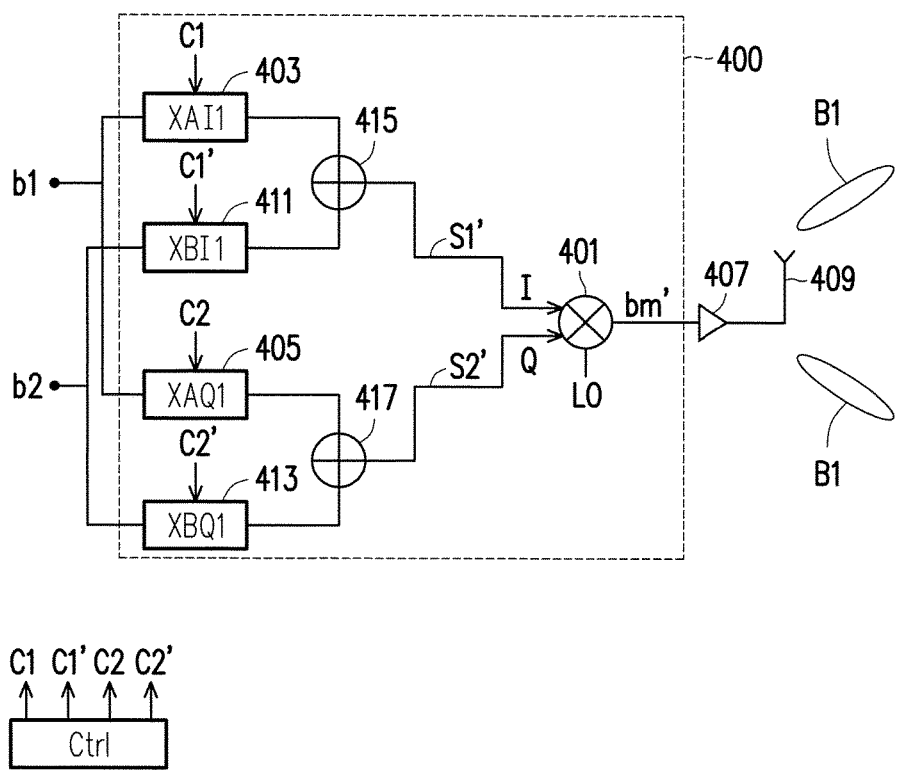
FIG. 4A is a schematic view illustrating a control apparatus for beamforming for a communication system with a single antenna and multiple input baseband signals according to an embodiment of the disclosure.

The embodiments shown in FIGS. 2A and 2B are examples where a communication system has a single input signal. In the embodiments shown in FIGS. 4A and 4B, examples where a communication system has multiple input signals are described. FIG. 4A is a schematic view illustrating a control apparatus 400 for beamforming for a communication system with a single antenna and multiple input baseband signals according to an embodiment of the disclosure. Assuming that the input signals are two baseband signals, for example, the control apparatus 400 for beamforming may include a first baseband amplitude control circuit 403, a second baseband amplitude control circuit 405, a third baseband amplitude control circuit 411, a fourth baseband amplitude control circuit 413, a first adder 415, a second adder 417, a frequency mixer 401, and the controller Ctrl. The controller Ctrl is coupled to and controls the first baseband amplitude control circuit 403, the second baseband amplitude control circuit 405, the third baseband amplitude control circuit 411, and the fourth baseband amplitude control circuit 413.

The first baseband amplitude control circuit 403, the second baseband amplitude control circuit 405, the third baseband amplitude control circuit 411, and the fourth baseband amplitude control circuit 413 are power amplifiers, for example, and are able to amplify or reduce amplitudes of the input signals to a predetermined extent and output the input signals with the amplified or reduced amplitudes. The first baseband amplitude control circuit 403, the second baseband amplitude control circuit 405, the third baseband amplitude control circuit 411, and the fourth baseband amplitude control circuit 413 may also be other types of circuits capable of controlling an amplitude of a signal. The disclosure does not intend to impose a limitation on this regard.

In the embodiment, the first baseband amplitude control circuit 403 and the second baseband amplitude control circuit 405 may receive the first baseband signal b1, and the third baseband amplitude control circuit 411 and the fourth baseband amplitude control circuit 413 may receive a second baseband signal b2. In addition, the first baseband signal b1 and the second baseband signal b2 may be analog signals, and the first baseband signal b1 and the second baseband signal b2 may be generated by converting a digital baseband signal by a DA converter.

The controller Ctrl may control the first amplitude magnification of the first baseband signal b1 in the first baseband amplitude control circuit 403 according to the control signal c1 and control the second amplitude magnification of the first baseband signal b1 in the second baseband amplitude control circuit 405 according to the control signal c2. In addition, the controller Ctrl may control a third amplitude magnification of the second baseband signal b2 in the third baseband amplitude control circuit 411 according to a control signal c1' and control a fourth amplitude magnification of the second baseband signal b2 in the fourth baseband amplitude control circuit 413 according to a control signal c2'.

The frequency mixer 401 may have two signal input ends, an LO signal end, and a signal output end. In addition, the signal input ends are respectively coupled to the first adder 415 and the second adder 417. The frequency mixer 401 is able to step up a frequency, and is able to insert a phase difference between two input signals. The phase difference is an included angle between vectors of the two input signals. For example, if the frequency mixer 401 is an in-phase and quadrature (IQ) frequency mixer, the frequency mixer 401 may consider two input signals as an in-phase (I) component and a quadrature (Q) component of an output signal of the frequency mixer 201. Specifically, the frequency mixer 401 may generate a 90-degree phase difference between two received input signals, and mix a LO signal received from the LO signal end respectively with the two input signals, so as to modulate carrier frequencies suitable for the two input signals. The carrier frequency may be set at an arbitrary frequency in a range from 30 GHz to 300 GHz (i.e., a millimeter wave frequency band). Accordingly, the frequency mixer 401 may adjust the carrier frequency of the output signal through the LO signal, and may output an output signal formed by linearly superposing the two input signals (I component and Q component). It should be noted that the respective embodiments of the disclosure assume that the frequency mixer 401 is an IQ frequency mixer. However, the disclosure is not limited thereto. In other words, the disclosure does not intend to limit that the phase difference between two input signals generated by the frequency mixer 401 is 90 degrees.

What differs from the embodiment shown in FIG. 2A is that, in the embodiment, when the controller Ctrl adjusts the magnification exerted to the first baseband signal b1 by the first baseband amplitude control circuit 403 to be AI1, so that the first baseband amplitude control circuit 403 outputs the first baseband signal b1 whose output amplitude is amplified AI1 times, the first baseband signal b1 amplified AI1 times (referred to as the first output signal in the following) is not directly transmitted to the frequency mixer 401. Similarly, when the controller Ctrl adjusts the magnification exerted to the first baseband signal b1 by the second baseband amplitude control circuit 407 to be AQ1, so that the second baseband amplitude control circuit 407 outputs the first baseband signal b1 whose output amplitude is amplified AQ1 times, the first baseband signal b1 amplified AQ1 times (referred to as the second output signal in the following) is not directly transmitted to the frequency mixer 401.

In the embodiment, the controller Ctrl may further adjust a magnification exerted to the second baseband signal s2 by the third baseband amplitude control circuit 411 to be BI1. Accordingly, the third baseband amplitude control circuit 411 outputs the second baseband signal b2 whose output amplitude is amplified BI1 times (referred to as a third output signal in the following). Similarly, the controller Ctrl may adjust a magnification exerted to the second baseband signal s2 by the fourth baseband amplitude control circuit 413 to be BQ1. Accordingly, the fourth baseband amplitude control circuit 413 outputs the second baseband signal b2 whose amplitude is amplified BQ1 times (referred to as a fourth output signal in the following).

The first adder 415 is coupled to the first baseband amplitude control circuit 403 and the third baseband amplitude control circuit 411, and the second adder 417 is coupled to the second baseband amplitude control circuit 405 and the fourth baseband amplitude control circuit 413. The first adder 415 and the second adder 417 may be implemented as any circuit capable of linearly superposing on two or more analog input signals.

When the respective baseband amplitude control circuits respectively generate the first output signal, the second output signal, the third output signal, and the fourth output signal, the first adder 415 may receive the first output signal from the first baseband amplitude control circuit 403 and receive the third output signal from the third baseband amplitude control circuit 411. Then, the first adder 415 may linearly superpose the first output signal and the third output signal to generate a first signal s1'. Similarly, the second adder 417 may receive the second output signal from the second baseband amplitude control circuit 405 and receive the fourth output signal from the fourth baseband amplitude control circuit 413. Then, the second adder 417 may linearly superpose the second output signal and the fourth output signal to generate a second signal s2'.

The frequency mixer 401 may receive the first signal s1' and the second signal s2', and insert a phase difference between the first signal s1' and the second signal s2'. Then, the frequency mixer may convert the first signal s1' and the second signal s2' having the phase difference therebetween into the beamformed signal bm' to control the antenna 409. Specifically, after receiving the first signal s1' and the second signal s2', the frequency mixer 401 may modulate carrier frequencies suitable for the first signal s1' and the second signal s2' through the LO signal received by the frequency mixer 401. In addition, the frequency mixer 201 may adopt the first signal s1' and the second signal s2' as the I component and the Q component of the beamformed signal bm' to be output, so as to adjust the beamformed signal bm' and the phase and thus transmit the beamformed signal bm' in a suitable direction.

In an embodiment, the first signal s1' forming the I component of the beamformed signal bm' and the second signal s2' forming the Q component of the beamformed signal bm' are generated through linear superposition after the amplitudes of the first baseband signal b1 and the second baseband signal b2 are modulated. Taking FIG. 4A as an example, assuming that the first amplitude magnification corresponding to the first baseband amplitude control circuit 403 and the second amplitude magnification corresponding to the second baseband amplitude control circuit 405 are respectively adjusted AI1 times and AQ1 times by the controller Ctrl, and the third amplitude magnification corresponding to the third baseband amplitude control circuit 411 and the fourth amplitude magnification corresponding to the fourth baseband amplitude control circuit 413 are respectively adjusted BI1 times and BQ1 times by the controller Ctrl, and assuming that the first baseband signal b1 and the second baseband signal b2 are time-variant signals, the first signal s1' and the second signal s2' may be represented as:

$$s1'(t) = b1(t) \times AI1 + b2(t) \times BI1$$

$$s2'(t) = b1(t) \times AQ1 + b2(t) \times BQ1$$

The frequency mixer 401 may adopt the first signal s1' and the second signal s2' as the I component and the Q component of the beamformed signal bm' to be output, so as to adjust the phase of the beamformed signal bm'. The beamformed signal bm' obtained after the adjustment by the frequency mixer 401 may be represented as:

$$\begin{aligned}bm' &= AI1 \cdot b1(t) \cdot \sin(\omega t) + BI1 \cdot b2(t) \cdot \sin(\omega t) + AQ1 \cdot b1(t) \cdot \\ &\quad \cos(\omega t) + BQ1 \cdot b2(t) \cdot \cos(\omega t) \\ &= b1(t) \cdot \sqrt{AI1^2 + AQ1^2} \times e^{j\tan^{-1}\frac{AQ1}{AI1}} + b2(t) \cdot \\ &\quad \sqrt{BI1^2 + BQ1^2} \times e^{j\tan^{-1}\frac{BQ1}{BI1}}, \\ &= b1(t) \cdot R1 \times e^{j\theta 1} + b2(t) \cdot R2 \times e^{j\theta 2}\end{aligned}$$

$$R1 = \sqrt{AI1^2 + AQ1^2},$$

$$\theta 1 = \tan^{-1}\frac{AQ1}{AI1},$$

$$R2 = \sqrt{BI1^2 + BQ1^2},$$

$$\theta 2 = \tan^{-1}\frac{BQ1}{BI1},$$

wherein ω=2πf, and f is a LO signal frequency provided by the local oscillator.

According to the formula of the beamformed signal bm', the beamformed signal bm' is generated by linearly superposing a signal (referred to as a first signal component B1) whose phase is θ1 and whose amplitude is b1(t)*R1 and a signal (referred to as a second signal component B2) whose phase is θ2 and whose amplitude is b2(t)*R2. Therefore, the beamformed signal bm' may be divided into a beamformed signal (i.e., the first signal component B1) corresponding to the first baseband signal b1 and a beamformed signal (i.e., the second signal component B2) corresponding to the second baseband signal b2. By adjusting the phase θ1 of the first signal component B1 and the phase θ2 of the second signal component B2, the control apparatus 400 for beamforming may transmit two beamformed signals respectively corresponding to the first baseband signal b1 and the second baseband signal b2 via the single antenna 409.

Even though the embodiment shown in FIG. 4A is described with an example where the input signals are two baseband signals, people having ordinary skills in the art should be able to learn through inference that the disclosure may also be implemented in a case where the input signals are two or more baseband signals according to the embodiment shown in FIG. 4A. Taking the control apparatus 400 for beamforming in FIG. 4A as an example, when the user intends to transmit beamformed signals corresponding to two or more baseband signals, the user may add two baseband amplitude control circuits and two adders each time when an additional input baseband signal is transmitted, and linearly superpose the output signals of the plurality of baseband amplitude control circuits according to the process, so as to generate the first signal and the second signal corresponding to the plurality of input baseband signals. Accordingly, the plurality of beamformed signals corresponding to the plurality of input baseband signals are generated.

Figure 4B:
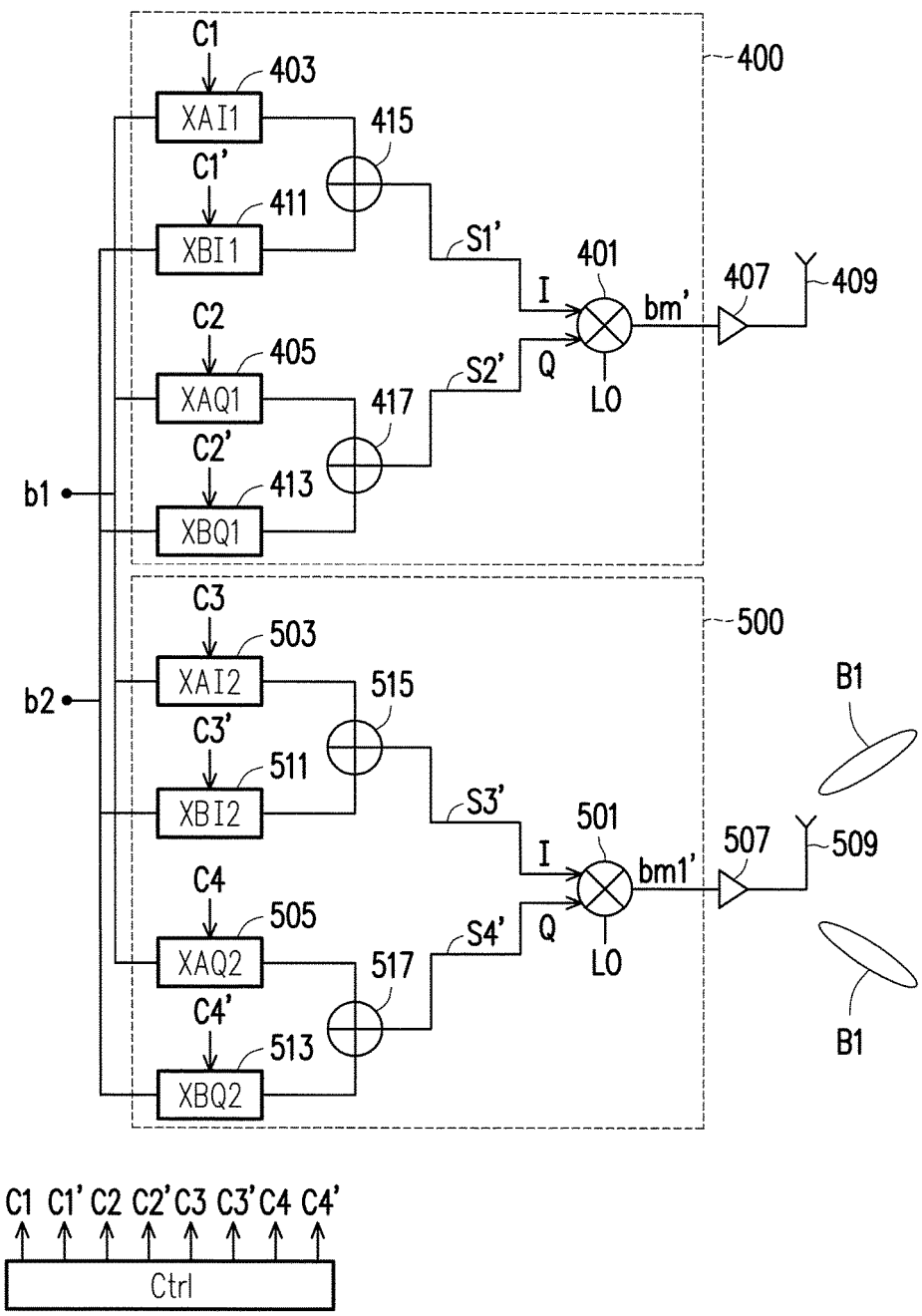
FIG. 4B is a schematic view illustrating a control apparatus for beamforming for a communication system with multiple antennas and multiple input baseband signals according to an embodiment of the disclosure.

FIG. 4B is a schematic view illustrating a control apparatus for beamforming for a communication system with multiple antennas and multiple input baseband signals according to an embodiment of the disclosure. In addition, the configuration and the operating principle of the control apparatus 400 for beamforming are the same as those of the control apparatus 400 for beamforming in FIG. 4A. Thus, details in these aspects will not be repeated in the following.

In addition to being implemented in a communication system with a single antenna to control the beamformed signal of the single antenna, the control apparatus 400 for beamforming of the disclosure may also be implemented in a communication system with multiple antennas to control the beamformed signals of the multiple antennas. FIG. 4B illustrates an example of controlling the beamformed signals of two antennas. In a case of controlling the beamformed signals of multiple antennas and that the input signals are a plurality of baseband signals, the control apparatus 400 for beamforming of the disclosure may be disposed to each of the antennas. In the example of FIG. 4B, the control apparatus 400 for beamforming is disposed to a first antenna 409, and a control apparatus 500 for beamforming having the same configuration and function as those of the control apparatus 400 for beamforming is disposed to a second antenna 509. The control apparatus 500 for beamforming may include a first baseband amplitude control circuit 503, a second baseband amplitude control circuit 505, a third baseband amplitude control circuit 511, a fourth baseband amplitude control circuit 513, a first adder 515, a second adder 517, a frequency mixer 501, and the controller Ctrl. In addition, the control apparatus 500 for beamforming may share the controller Ctrl with the control apparatus 400 for beamforming to adjust the amplitude magnifications of the respective baseband amplitude control circuits, or the control apparatus 500 for beamforming and the control apparatus 400 for beamforming may use respectively different controllers. The disclosure does not intend to impose a limitation in this regard.

The first baseband amplitude control circuit 503, the second baseband amplitude control circuit 505, the third baseband amplitude control circuit 511, and the fourth baseband amplitude control circuit 513 of the control apparatus 500 for beamforming have the same configurations and operating principles as those of the first baseband amplitude control circuit 403, the second baseband amplitude control circuit 405, the third baseband amplitude control circuit 411, and the fourth baseband amplitude control circuit 413 of the control apparatus 400 for beamforming. In other words, when the controller Ctrl intends to adjust a phase of a component related to the first baseband signal b1 in a beamformed signal bm1' to θ3 and intends to adjust a phase of a component related to the second baseband signal b2 to θ4, the controller Ctrl may also respectively adjust the first amplitude magnification corresponding to the first baseband amplitude control circuit 503 and the second amplitude magnification corresponding to the second baseband amplitude control circuit 505 AI2 times and AQ2 times and respectively adjust the third amplitude magnification corresponding to the third baseband amplitude control circuit 511 and the fourth amplitude magnification corresponding to the fourth baseband amplitude control circuit 513 BI2 times and BQ2 times. Under the circumstance, a first signal s3' and a second signal s4' may be represented as follows:

$$s3'(t)=b1(t) \times AI2+b2(t) \times BI2$$

$$s4'(t)=b1(t) \times AQ2+b2(t) \times BQ2$$

The frequency mixer 501 may adopt the first signal s3' and the second signal s4' as the I component and the Q component of the beamformed signal bm1' to be output, so as to adjust the phase of the beamformed signal bm1'. The beamformed signal bm1' obtained after the adjustment by the frequency mixer 501 may be represented as:

$$\begin{aligned}bm1' &= AI2 \cdot b1(t) \cdot \sin(\omega t) + BI2 \cdot b2(t) \cdot \sin(\omega t) + AQ2 \cdot b1(t) \cdot \\ &\quad \cos(\omega t) + BQ2 \cdot b2(t) \cdot \cos(\omega t) \\ &= b1(t) \cdot \sqrt{AI2^2 + AQ2^2} \times e^{j\tan^{-1}\frac{AQ2}{AI2}} + b2(t) \cdot \\ &\quad \sqrt{BI2^2 + BQ2^2} \times e^{j\tan^{-1}\frac{BQ2}{BI2}} \\ &= b1(t) \cdot R1 \times e^{j\theta 1} + b2(t) \cdot R2 \times e^{j\theta 2},\end{aligned}$$

$$R3 = \sqrt{AI2^2 + AQ2^2},$$

$$\theta 3 = \tan^{-1}\frac{AQ2}{AI2},$$

$$R4 = \sqrt{BI2^2 + BQ2^2},$$

$$\theta 4 = \tan^{-1}\frac{BQ2}{BI2},$$

wherein ω=2πf, and f is a LO signal frequency provided by the local oscillator.

According to the formula of the beamformed signal bm1', the beamformed signal bm1' is generated by linearly superposing a signal (referred to as a first signal component B3) whose phase is θ3 and whose amplitude is b1(t)*R3 and a signal (referred to as a second signal component B4) whose phase is θ4 and whose amplitude is b2(t)*R4. Therefore, the beamformed signal bm1' may be divided into a beamformed signal (i.e., the first signal component B3) corresponding to the first baseband signal b1 and a beamformed signal (i.e., the second signal component B4) corresponding to the second baseband signal b2. By adjusting the phase θ3 of the first signal component B3 and the phase θ4 of the second signal component B4, the control apparatus 500 for beamforming of the embodiment is able to respectively transmit the beamformed signal corresponding the first baseband signal b1 and having the phase θ3 and the beamformed signal corresponding to the second baseband signal b2 and having the phase θ4 via the antenna 509, in addition to respectively transmitting the beamformed signal corresponding to the first baseband signal s1 and having the phase θ1 and the beamformed signal corresponding to the second baseband signal b2 and having the phase θ2 via the antenna 409.

Even though the embodiment shown in FIG. 4B is described with an example where the input signals are two baseband signals, people having ordinary skills in the art should be able to learn through inference that the disclosure may also be implemented in a case where the input signals are two or more baseband signals according to the embodiment shown in FIG. 4B. Taking the control apparatuses 400 and 500 for beamforming in FIG. 4B as an example, when the user intends to transmit beamformed signals corresponding to two or more baseband signals, the user may add two baseband amplitude control circuits and two adders for each antenna each time when an additional input baseband signal is transmitted and linearly superpose the output signals of the plurality of baseband amplitude control circuits according to the process to generate the first signal and the second signal corresponding to the plurality of input baseband signals for each antenna. Accordingly, the plurality of beamformed signals corresponding to the plurality of input baseband signals are generated.

Figure 5:
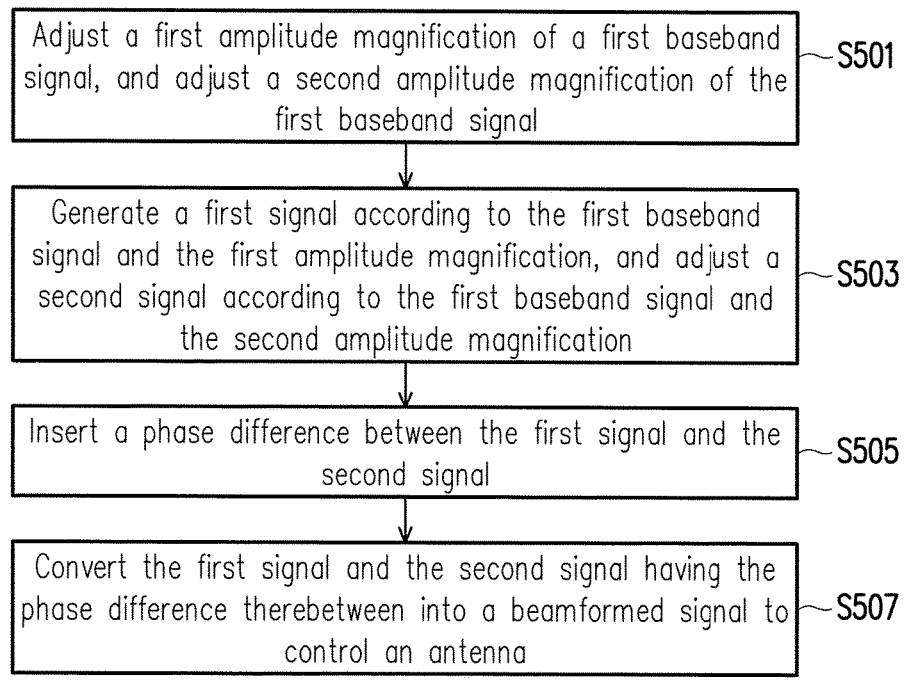
FIG. 5 is a flowchart illustrating a control method for beamforming according to an embodiment of the disclosure.

FIG. 5 is a flowchart illustrating a control method for beamforming according to an embodiment of the disclosure. The control method is suitable for the control apparatus 200 for beamforming of the disclosure. The method includes steps as follows. At Step S501, the first amplitude magnification of the first baseband signal b1 and the second amplitude magnification of the first baseband signal b1 are adjusted by the controller Ctrl. At Step S503, the first baseband amplitude control circuit 203 generates the first signal s1 according to the first baseband signal b1 and the first amplitude magnification, and the second baseband amplitude control circuit 205 generates the second signal s2 according to the first baseband signal b1 and the second amplitude magnification. At Step S505, the frequency mixer 201 inserts a phase difference between the first signal s1 and the second signal s2. At Step S507, the frequency mixer 201 converts the first signal s1 and the second signal s2 having the phase difference therebetween into the beamformed signal bm to control the antenna 209.

In view of the foregoing, the control apparatus according to the embodiments of the disclosure extracts two baseband signals from the first baseband signal, and converts the two baseband signals into the beamformed signal. By respectively adjusting the phases of the two baseband signals, the embodiments of the disclosure are able to provide beamformed signals with suitable phases for the communication system with multiple antennas. In addition, in the case when the input signals are a plurality of baseband signals, the control apparatus according to the embodiments of the disclosure may generate a plurality of beamformed signals corresponding to the plurality of baseband signals, so that the communication system with multiple antennas may transmit the plurality of beamformed signals carrying different baseband signal information. Thus, according to the embodiments of the disclosure, beamforming may be carried out at a higher precision without a phase shifter as well as a greater number of digital-to-analog (DA) converters.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A control apparatus for beamforming, comprising:
a first baseband amplitude control circuit and a second baseband amplitude control circuit, wherein the first baseband amplitude control circuit and the second baseband amplitude control circuit receive a first baseband signal;
a frequency mixer, coupled to the first baseband amplitude control circuit and the second baseband amplitude control circuit;
a controller, coupled to the first baseband amplitude control circuit and the second baseband amplitude control circuit, adjusting a first amplitude magnification of the first baseband signal in the first baseband amplitude control circuit and adjusting a second amplitude magnification of the first baseband signal in the second baseband amplitude control circuit;
a third baseband amplitude control circuit, receiving a second baseband signal, wherein the controller is coupled to the third baseband amplitude control circuit, and the controller adjusts a third amplitude magnification of the second baseband signal in the third baseband amplitude control circuit;
a fourth baseband amplitude control circuit, receiving the second baseband signal, wherein the controller is coupled to the fourth baseband amplitude control circuit, and the controller adjusts a fourth amplitude magnification of the second baseband signal in the fourth baseband amplitude control circuit;
a first adder, coupled to the first baseband amplitude control circuit and the third baseband amplitude control circuit; and
a second adder, coupled to the second baseband amplitude control circuit and the fourth baseband amplitude control circuit,
wherein the first baseband amplitude control circuit generates a first signal according to the first baseband signal and the first amplitude magnification, and the second baseband amplitude control circuit generates a second signal according to the first baseband signal and the second amplitude magnification,
the frequency mixer receives the first signal and the second signal and inserts a phase difference between the first signal and the second signal,
the frequency mixer converts the first signal and the second signal having the phase difference therebetween into a beamformed signal to control an antenna,
the third baseband amplitude control circuit generates a third output signal according to the second baseband signal and the third amplitude magnification, and the first baseband amplitude control circuit further generates a first output signal according to the first baseband signal and the first amplitude magnification, the fourth baseband amplitude control circuit generates a fourth output signal according to the second baseband signal and the fourth amplitude magnification, and the second baseband amplitude control circuit further generates a second output signal according to the first baseband signal and the second amplitude magnification, the first adder receives the first output signal and the third output signal and generates the first signal according to the first output signal and the third output signal, and the second adder receives the second output signal and the fourth output signal and generates the second signal according to the second output signal and the fourth output signal.

2. The control apparatus for beamforming as claimed in claim 1, wherein the beamformed signal comprises a first signal component corresponding to the first baseband signal and a second signal component corresponding to the second baseband signal.

3. The control apparatus for beamforming as claimed in claim 1, wherein the frequency mixer converts the first signal and the second signal having the phase difference therebetween into the beamformed signal by linear superposition.

4. The control apparatus for beamforming as claimed in claim 1, wherein a phase of the beamformed signal is an arctangent function of a ratio between the first amplitude magnification and the second amplitude magnification.

5. The control apparatus for beamforming as claimed in claim 1, wherein a sum of squares of the first amplitude magnification and the second amplitude magnification is 1.

6. The control apparatus for beamforming as claimed in claim 1, wherein a sum of squares of the first amplitude magnification and the second amplitude magnification is not 1.

7. The control apparatus for beamforming as claimed in claim 1, wherein the phase difference is an included angle between a vector of the first signal and a vector of the second signal.

8. The control apparatus for beamforming as claimed in claim 1, wherein the phase difference is 90 degrees.

9. The control apparatus for beamforming as claimed in claim 1, wherein the phase difference is not 90 degrees.

10. The control apparatus for beamforming as claimed in claim 1, wherein the first baseband signal and the second baseband signal are analog signals, and the beamformed signal is an analog signal.

11. The control apparatus for beamforming as claimed in claim 1, wherein the control apparatus for beamforming does not comprise a phase shifter.

12. A control method for beamforming, comprising:

adjusting a first amplitude magnification of a first baseband signal, and adjusting a second amplitude magnification of the first baseband signal;

generating a first signal according to the first baseband signal and the first amplitude magnification, and generating a second signal according to the first baseband signal and the second amplitude magnification;

adjusting a third amplitude magnification of a second baseband signal, and adjusting a fourth amplitude magnification of the second baseband signal;

generating a third output signal according to the second baseband signal and the third amplitude magnification, and generating a first output signal according to the first baseband signal and the first amplitude magnification;

generating a fourth output signal according to the second baseband signal and the fourth amplitude magnification, and generating a second output signal according to the first baseband signal and the second amplitude magnification;

inserting a phase difference between the first signal and the second signal;

converting the first signal and the second signal having the phase difference therebetween into a beamformed signal to control an antenna;

generating the first signal according to the first output signal and the third output signal; and generating the second signal according to the second output signal and the fourth output signal.

13. The control method as claimed in claim 12, wherein the beamformed signal comprises a first signal component corresponding to the first baseband signal and a second signal component corresponding to the second baseband signal.

14. The control method as claimed in claim 12, wherein the first signal and the second signal having the phase difference therebetween are converted into the beamformed signal by linear superposition.

15. The control method as claimed in claim 12, wherein a phase of the beamformed signal is an arctangent function of a ratio between the first amplitude magnification and the second amplitude magnification.

16. The control method as claimed in claim 12, wherein a sum of squares of the first amplitude magnification and the second amplitude magnification is 1.

17. The control method as claimed in claim 12, wherein a sum of squares of the first amplitude magnification and the second amplitude magnification is not 1.

18. The control method as claimed in claim 12, wherein the phase difference is an included angle between a vector of the first signal and a vector of the second signal.

19. The control method as claimed in claim 12, wherein the phase difference is 90 degrees.

20. The control method as claimed in claim 12, wherein the phase difference is not 90 degrees.

21. The control method as claimed in claim 12, wherein the first baseband signal and the second baseband signal are analog signals, and the beamformed signal is an analog signal.

22. The control method as claimed in claim 12, wherein the method is carried out without a phase shifter.

* * * * *